US007664898B2

(12) United States Patent
Jin et al.

(10) Patent No.: US 7,664,898 B2
(45) Date of Patent: Feb. 16, 2010

(54) METHOD AND SYSTEM FOR EFFICIENT FRAMING ON ADDRESSED BUSES

(75) Inventors: Changxi Jin, San Jose, CA (US);
Stephen G. Siener, San Francisco, CA (US); Neal Nuckolls, Mountain View, CA (US); Guillermo A. Loyola, Palo Alto, CA (US)

(73) Assignee: Broadcom, Irvine, CA (US)

( * ) Notice: Subject to any disclaimer, the term of this patent is extended or adjusted under 35 U.S.C. 154(b) by 0 days.

(21) Appl. No.: 11/345,014

(22) Filed: Feb. 1, 2006

(65) Prior Publication Data

US 2007/0180173 A1 Aug. 2, 2007

(51) Int. Cl.
*G06F 13/42* (2006.01)
*G06F 3/00* (2006.01)
*G06F 13/24* (2006.01)
*G08C 25/00* (2006.01)
*H03M 13/00* (2006.01)
*H04L 1/00* (2006.01)
*G06F 11/10* (2006.01)

(52) U.S. Cl. .................... 710/106; 710/3; 710/260; 714/799; 714/807

(58) Field of Classification Search ............. 710/3, 710/4, 30, 105, 106, 301, 260; 714/799, 714/807; 709/216
See application file for complete search history.

(56) References Cited

U.S. PATENT DOCUMENTS

| 4,644,529 | A | * | 2/1987 | Amstutz et al. ............. 370/422 |
| 5,537,558 | A | * | 7/1996 | Fletcher et al. ............. 710/305 |
| 5,809,068 | A | * | 9/1998 | Johnson ....................... 375/222 |
| 6,028,892 | A | * | 2/2000 | Barabash et al. ............. 375/222 |
| 6,101,378 | A | * | 8/2000 | Barabash et al. ............. 455/406 |
| 6,363,428 | B1 | * | 3/2002 | Chou et al. .................. 709/232 |
| 6,725,413 | B1 | * | 4/2004 | Ishida ......................... 714/758 |
| 6,760,333 | B1 | * | 7/2004 | Moody et al. ............. 370/395.1 |
| 7,251,704 | B2 | * | 7/2007 | Solomon et al. ............. 710/316 |
| 2001/0047475 | A1 | * | 11/2001 | Terasaki ....................... 713/160 |

(Continued)

OTHER PUBLICATIONS

"LAN Data Link Layer Protocols". Protocol Directory. Online Aug. 17, 2000. Retrieved from Internet May 21, 2008. <http://web.archive.org/web/20000817202644/http://www.protocols.com/pbook/lan.htm>.*

(Continued)

*Primary Examiner*—Thomas J Cleary
(74) *Attorney, Agent, or Firm*—McAndrews, Held & Malloy, Ltd.

(57) ABSTRACT

A framing mechanism may be provided that enables passing of messages over an addressed bus. This creates a form of information hiding, which passes information by converting an addressed bus interface to a message-based bus interface. Address-based information in a transaction may be replaced with additional information that specifies framing details comprising, for example, a check pattern and length information. The check pattern provides a mechanism for determining whether frame information may be valid. An end device may utilize this length information to determine an actual length of an incoming frame. The combination of the check pattern and the length information may provide a pattern for resynchronizing a data stream when errors are detected. The framing mechanism may operate over existing addressed buses without requiring host side controller hardware modifications and additional host side software driver may be utilized to add the framing information.

29 Claims, 3 Drawing Sheets

U.S. PATENT DOCUMENTS

| | | | | |
|---|---|---|---|---|
| 2001/0053148 | A1* | 12/2001 | Bilic et al. | 370/389 |
| 2004/0054955 | A1* | 3/2004 | Riley | 714/781 |
| 2004/0123221 | A1* | 6/2004 | Huffman et al. | 714/776 |
| 2005/0105549 | A1* | 5/2005 | Ishida et al. | 370/463 |
| 2006/0072564 | A1* | 4/2006 | Cornett et al. | 370/389 |
| 2006/0098648 | A1* | 5/2006 | Fukunaga et al. | 370/389 |
| 2006/0104227 | A1* | 5/2006 | Chuang | 370/328 |
| 2007/0162981 | A1* | 7/2007 | Morioka et al. | 726/30 |

OTHER PUBLICATIONS

"Secure Digital Input/Output (SDIO) Card Specification". Version 1.00. Oct. 2001. SD Association.*

"Webopedia". Entry 'SD Card'. Online Jan. 5, 2005. Retrieved from Internet May 23, 2008. <http://www.webopedia.com/TERM/S/SD_Card.html>.*

"About PCMCIA". Personal Computer Memory Card Internation Association. 1998. Retrieved from Internet Jan. 14, 2009. pp. 1-4. <http://web.archive.org/web/19990827013904/http://www.pcmcia.org/about.htm>.*

* cited by examiner

# METHOD AND SYSTEM FOR EFFICIENT FRAMING ON ADDRESSED BUSES

CROSS-REFERENCE TO RELATED APPLICATIONS/INCORPORATION BY REFERENCE

Not Applicable.

FIELD OF THE INVENTION

Certain embodiments of the invention relate to communication of information on a bus. More specifically, certain embodiments of the invention relate to a method and system for efficient framing on addressed buses.

BACKGROUND OF THE INVENTION

In conventional systems, message passing may be utilized as an interface that facilitates communication between a host and intelligent device(s). For example, the universal serial bus (USB) protocol provides a message passing mechanism over a serial hardware bus to facilitate communication between a host device and one or more end devices. The USB protocol allows larger units of data such as data frames to be conveyed over a serial bus within USB packets, and each USB packet may be addressed to a particular end device and a logical endpoint within the end device. This is achieved without using a more specific address. This allows an intelligent USB device to further process the frame.

An addressed bus such as PCI, PCMCIA/CF, and/or SDIO may comprise a 32-bit, 26-bit, or 17-bit address as part of each command, which is utilized for routing or directing corresponding data to or from a specific location within a device. These addressed buses may not directly support the higher-level concepts of framing, which may comprise composing a larger sequence of data octets from a number of smaller individual bus transactions. Additionally, these addressed buses may not directly support addressed messages, which are messages that are addressed only to device or to some logical function or endpoint within the device but not to a specific memory address location within the device. This may be problematic for an intelligent device, which intends to further process the data before directing it to/from an underlying media device because it requires a lower level, more entangled sharing of memory regions on the device between the intelligent device and software that may be executing on a host.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for efficient framing on addressed buses, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
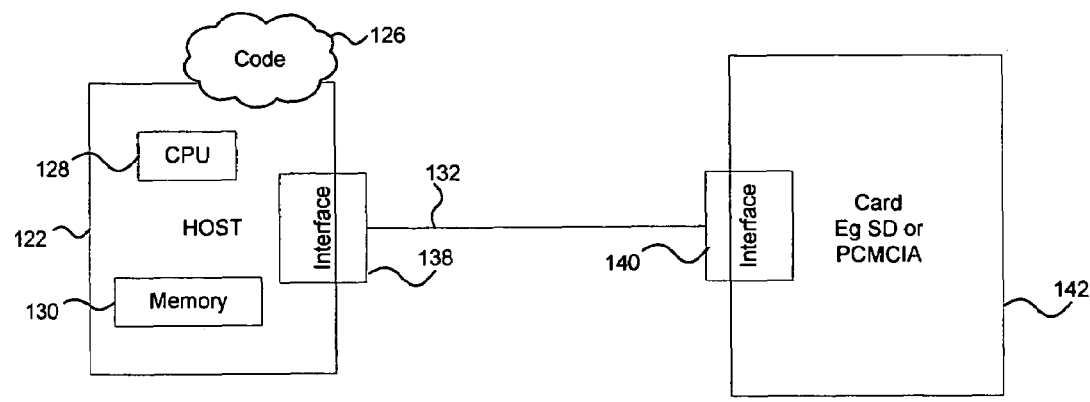
FIG. 1a is a diagram illustrating a host device communicating over a bus with a dumb device such as a memory card, which may be utilized in connection with an embodiment of the invention.

Certain embodiments of the invention may be found in a method and system for efficient framing on addressed buses. Such a method may be utilized for sending, for example, PCMCIA/CF (Personal Computer Memory Card International Association) messages or SDIO (Secure Digital Input Output) messages between a host device and one or more logical endpoints located within a physical endpoint device. A PCMCIA/CF or SDIO card may be connected to an intelligent device such as, for example, a host, via a PCMCIA/CF or SDIO slot to transfer data from the PCMCIA/CF or SDIO card to the intelligent device. Various embodiments of the invention may leverage this same infrastructure and allow an endpoint containing a CPU, code and memory to utilize, for example, the PCMCIA/CF protocol or the SDIO protocol, to communicate messages with the intelligent device such as the host. This allows standardized PCMCIA/CF and standardized SDIO compatibility to be maintained, while at the same time allowing the endpoint, which may comprise one or more logical entities to communicate via the PCMCIA/CF or SDIO bus interface.

Various embodiments of the invention provide a framing mechanism that may enable passing of messages over an addressed bus. In this regard, a form of information hiding, which converts an addressed bus interface to a message-based bus interface, may be utilized to pass information. The address-based information in the transaction may be replaced with additional information that specifies framing details. Exemplary components of the framing information may comprise check pattern information and length information. The check pattern information may provide a mechanism for determining whether frame information may be valid. An end device may utilize length information to determine an actual length of an incoming frame. In one aspect of the invention, the combination of the check pattern information and the length information may provide a pattern for resynchronizing a data stream when errors are detected. Various embodiments of the invention may work over existing addressed buses without requiring host side controller hardware modifications. An additional host side software driver may be utilized to add the framing information.

Various embodiments of the invention provide efficient means to pass data over an addressed bus. A relatively simple interface that allows transfer of data may be presented. Aspects of the invention provide a method that may minimize the overhead associated with data transmission thereby increasing the overall bandwidth. Various embodiments of the invention may be utilized with a device supporting one or more communications technologies such as IEEE 802.11 or Ethernet, and using SDIO or PCMCIA/CF to interface to a controlling host electronic device; a device supporting one or more local media technologies such as ATA, SATA, IDE, FLASH, or other non-volatile storage methods; and using SDIO or PCMCIA/CF to interface to a controlling host electronic device.

FIG. 1a is a diagram illustrating a host device communicating over a bus with a dumb device such as a memory card, which may be utilized in connection with an embodiment of the invention. Referring to FIG. 1a, there may be a host device 122 having a CPU 128, a memory 130, and code 126. A dumb memory card 142 may be connected to the host device 122 via a bus 132. The bus 132 may be, for example, a SDIO or PCMCIA/CF bus. The memory card 142 may be, for example, a SDIO card or PCMCIA/CF card. The memory card 142 may be connected to the bus 132 via an interface 140, and the host device 122 may be connected to the bus 132 via an interface 138. This is an addressed based scheme since the host device 122 accesses the endpoint device 140 via an address that identifies the device. The endpoint device 140 lacks any intelligence to initiate communication with the host device 122.

Data may be transferred from the memory card 142 to the host device 122 via the bus 132. The transferred data may be encoded in a standard associated with the card, such as, for example, SDIO, PCMCIA/CF, etc. The bus 132 may be compatible for transferring any associated type of data. Accordingly, if, for example, the memory card 142 is a SDIO card, the bus 132 may be a SDIO bus and a SDIO protocol may be utilized to facilitate the communication of the data between the memory card 142 and the host device 122.

Figure 1B:
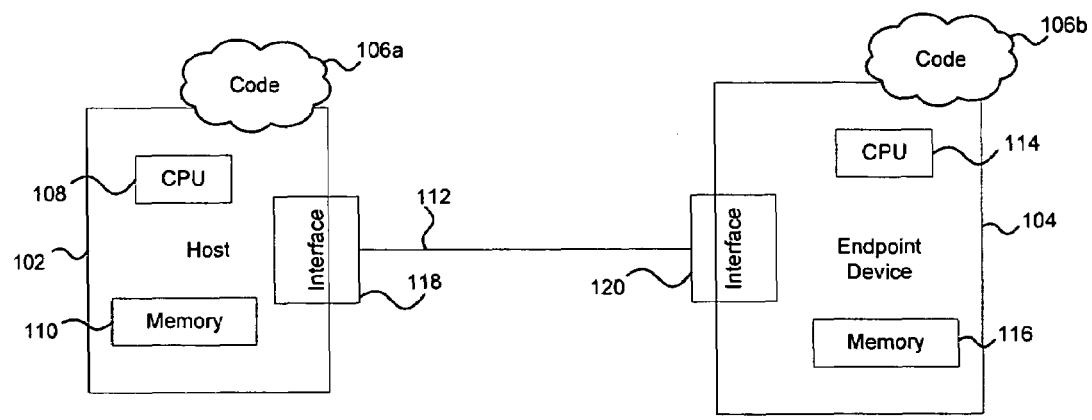
FIG. 1b illustrates a block diagram of an exemplary setup of a host device and an end device, in accordance with an embodiment of the present invention.

FIG. 1b illustrates a block diagram of an exemplary setup of a host device and an end device, in accordance with an embodiment of the present invention. Referring to FIG. 1b, there is shown a host device 102, and at least one end device 104. The host device 102 and the end device 104 may be connected via a bus 112. The bus 112 may be, for example, a SDIO or PCMCIA/CF bus. The host 102 may comprise host CPU 108, host memory 110, and host software 106a. The end device 104 may comprise CPU 114, memory 116. The memory 116 may store data that is received from the host device 102 or store data that is to be transferred to the host device 102.

In an embodiment of the invention, the SDIO protocol may be utilized for communicating data between the end device 104 and the host device 102. In such an embodiment of the invention, the data stored in the memory 116, which is to be transferred to the host device 102, the end device CPU 114 may modify various fields in the first header and payload section at the start of a standardized SDIO frame. The resulting modified SDIO frame may then be communicated over the bus 112 to the host device 102 using standardized SDIO protocol. A frame read by host device 102, directed to a function number of a specified value or pattern on the endpoint device 104, is handled differently from a regular SDIO frame. In this regard, the CPU 108 may examine specific data in the corresponding payload portion of the received message in order to determine an actual length of the message. Once the actual length of the message is determined, the subsequent data up to the specified length may be treated as the complete message or frame.

On the endpoint device 104 side, the modification of the various fields in the first header and payload section at the start of a standardized SDIO frame may comprise adding framing information to the data by the CPU 114, which may be controlled by the code 106b. The framing information may comprise, for example, check pattern information and length information, which may be added to the starting bytes of a frame. Once the CPU 114 adds the framing information to the data, the data may then be transferred from the endpoint device 104 to the host 102 via the bus 112 as standard SDIO formation. If the function number specified in a read transaction directed to the endpoint device 104 by the host device 102 is of a specified value or pattern, then the check pattern information and length information may be checked. If the check pattern indicates that the length is valid, then a frame of length corresponding to the length information may be processed. The processed data may then be stored in the memory 110 and utilized by various applications or logical entities on the host.

On the host device 102 side, the modification of the various fields in the first header and payload section at the start of a standardized SDIO frame may comprise adding framing information to the data by the CPU 108, which may be controlled by the code 106a. The framing information may comprise, for example, check pattern information and length information, which may be added to the starting bytes of a frame. Once the CPU 108 adds the framing information to the data, the data may then be transferred from the host device 102 to the endpoint device 104 via the bus 112 as standard SDIO formation. Once the endpoint device 104 receives the data, the endpoint device 104, which may be under control of the code 106b, may examine the function number, the check pattern information and/or the length information. If the function number has a specified value or pattern, then the check pattern information and length information may be checked. If the check pattern indicates that the length is valid, then a frame of length corresponding to the length information may be processed. The processed data may then be stored in the memory 116 and utilized by various applications or logical entities on the endpoint device.

In an embodiment of the invention, the PCMCIA/CF protocol may be utilized for communicating data between the end device 104 and the host device 102. In such an embodiment of the invention, the data stored in the memory 116, which is to be transferred to the host device 102, the end device CPU 114 may modify various fields in the first header and payload section at the starting bytes of a standardized PCMCIA/CF transfer. The resulting modified PCMCIA/CF frame may then be read by the host device 102 over the bus 112 using standardized PCMCIA/CF protocol. The host device 102 reads the modified PCMCIA/CF frame from a specified address range on the device 104, which determines that the message is to be handled differently from a regular PCMCIA/CF transfer. The CPU 108 may examine the header at the starting bytes of the PCMCIA/CF frame in order to determine an actual length of the message. Once the actual length of the message is determined, the subsequent data up to the specified length may be treated as a complete message or frame.

On the endpoint device 104 side, the modification of the various fields in the first header and payload section at the start of a standardized PCMCIA/CF transfer may comprise adding framing information to the data by the CPU 114, which may be controlled by the code 106b. The framing information may comprise, for example, check pattern information and length information, which may be added to the starting bytes of a frame. Once the CPU 114 adds the framing information to the data, the data may then be transferred from the endpoint device 104 to the host 102 via the bus 112 as standard PCMCIA/CF transfer. Once the host device 102 receives the data, the host device 102, which may be under control of the code 106a, may examine the check pattern information and/or the length information. If the check pattern indicates that the length is valid, then a frame of length corresponding to the length information may be processed. The processed data may then be stored in the memory 110 and utilized by various applications or logical entities on the host.

On the host device 102 side, the modification of the various fields in the first header and payload section at the start of a standardized PCMCIA/CF transfer may comprise adding framing information to the data by the CPU 108, which may be controlled by the code 106a. The framing information may comprise, for example, check pattern information and length information, which may be added to the starting bytes of a frame. Once the CPU 108 adds the framing information to the data, the data may then be transferred from the host device 102 to the endpoint device 104 via the bus 112 as standard PCMCIA/CF transfer. Once the endpoint device 104 receives the data, the endpoint device 104, which may be under control of the code 106b, may examine the check pattern information and/or the length information. If the check pattern indicates that the length is valid, then a frame of length corresponding to the length information may be processed. The processed data may then be stored in the memory 116 and utilized by various applications or logical entities on the endpoint device.

Figure 2:
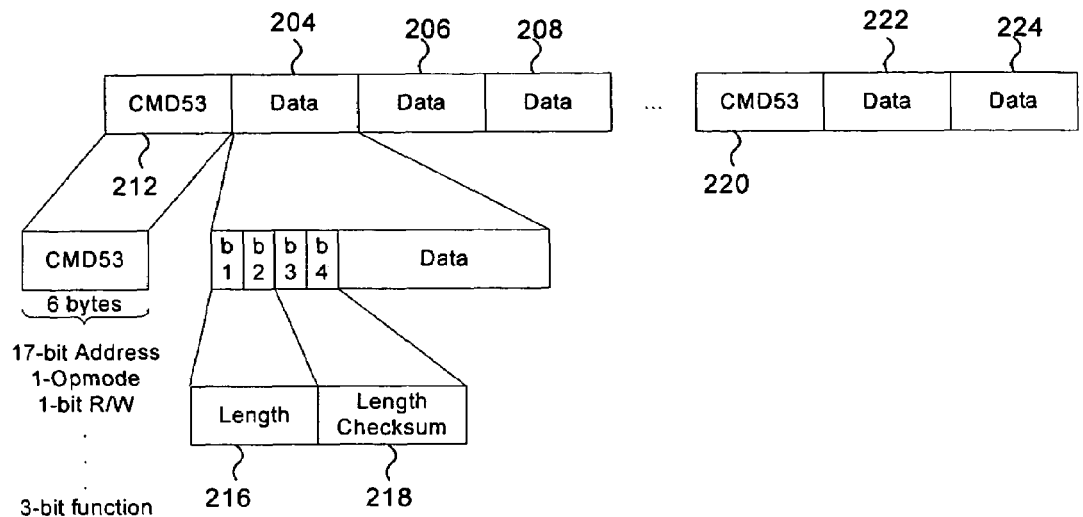
FIG. 2 illustrates a block diagram of an exemplary SDIO frame, in accordance with an embodiment of the present invention.

FIG. 2 illustrates a block diagram of an exemplary SDIO frame, in accordance with an embodiment of the present invention. The frame may comprise one or more command, each followed by one or more data blocks. Referring to FIG. 1b, the end device 104 may organize the data into frames. Frame information may then be attached to each frame. For example, the frame information may comprise frame length information and length check information. The frame length information and length check information may be inserted into the first bytes of data in a frame. The function number may be part of a command defined by the SDIO standard, sent as the command field, followed by the data blocks of the frame.

Referring to FIG. 2, a frame 202 may comprise a command block 212 blocks of data 204, 206, 208, command block 220, blocks of data 222, 224, etc. In SDIO the CMD53 command field may indicate a function associated with the data field. Therefore, a specified function may be utilized in the CMD53 command field to indicate when a block of data in a frame contains frame length and check information. The frame length and check information may be inserted into the data block 204, for example, the first 4 bytes of the data block 204. The frame length and check information may comprise the frame length 216 and the frame length checksum 218. The frame length checksum 218 may be utilized to determine whether there is an error in the frame length 216.

At the host side, if the function number addressed has a specified value or pattern, then the check pattern information and length information may be checked. The software may then retrieve the first 4 bytes of data read from the device to determine the frame length and the frame length checksum. If the frame length checksum indicates no errors, the host may receive the frame of data and make the received frame available to the processor or applications as desired.

Referring again to FIG. 2 for the SDIO data, a specified function number may be used in the command field 212. The host may utilize CMD53 commands to indicate the specific function in the command field. When the specific function is used, the CMD53 address and opcode may be ignored by the end device. The data field 214 associated with the block of data having the specified function number may start with a 4-byte length tag, where the first 2 bytes 216 may indicate the frame length in bytes and the next 2 bytes 218 may indicate the checksum pattern. The checksum pattern may be a simple bit-wise inverse of the frame length field, i.e., Byte2=not (Byte0) and Byte3=not (Byte1). The frames 204 may be transferred using any combination of CMD52 and CMD53 (mixed sizes including odd and even lengths), therefore, the length of each frame may vary. The frames may be arranged such that they may begin on a CMD53 data segment boundary. Additionally, CMD53 write data in excess of the number of bytes indicated by the tag length field may be discarded by the device when arranging frames. In some instances, the final CMD53 read of a frame may request more than the remaining number of bytes of that frame, in which case the device may add as many filler bytes as needed to satisfy the requested read size.

When data is available, the device may issue an indication such as, for example, an interrupt to signal that one or more data frames may be available on the device for the host to read. The host may then issue reads of the 4 byte frame header at any time, if a frame is available, the header read returns a nonzero length (>=4) and the host can then read the remainder of the frame by issuing one or more CMD53 reads. If a frame is not available, the 4-byte header read returns a specified 4-byte pattern to indicate that no more frame data is available.

Figure 3:
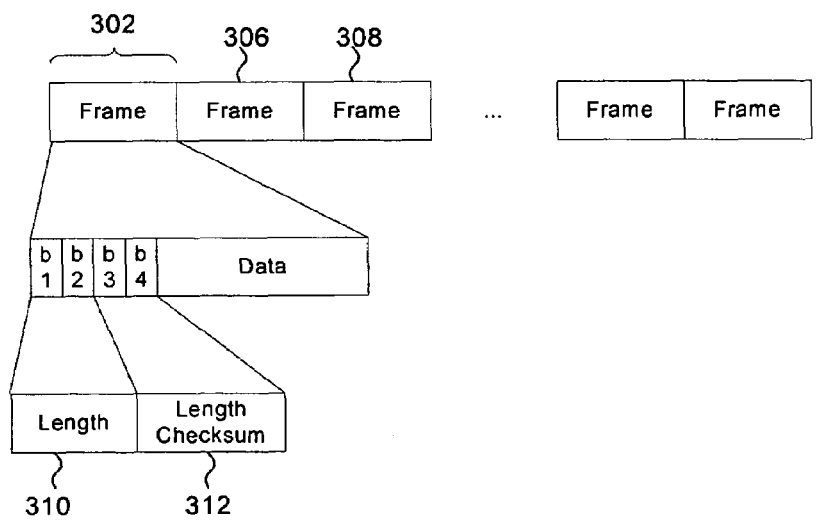
FIG. 3 illustrates a block diagram of an exemplary PCMCIA/CF frame, in accordance with an embodiment of the present invention.

FIG. 3 illustrates a block diagram of an exemplary PCMCIA/CF data frame, in accordance with an embodiment of the present invention. The data frame 302 may comprise a series of data bytes. Referring to FIG. 1b, the end device 104 may organize the data into frames. Frame information may then be attached to each frame. For example, the frame information may comprise frame length and length check. The frame information may be inserted into the first bytes of data in a frame. Referring to FIG. 3, the frame 302 may comprise 4 initial bytes that indicate the length and length checksum for the frame 302. The frame information may be inserted into the data transfer 302, for example, the first 4 bytes. The frame information may comprise the frame length 310 and the frame length checksum 312. Where the frame length 310 may indicate the number of bytes in the frame 302, and the frame length checksum 312 may be utilized to determine whether there is an error in the frame length 310.

The device may arrange data transfers as a frame when a PCMCIA/CF read or write address matches a specified address range. The device may then ignore the read/write address and each frame may be implemented with the 4-byte length tag comprising the first 2 bytes indicating the frame length, and the next 2 bytes indicating the length checksum. The frames may be transferred using any combination of 1- and 2-byte reads and writes, for example.

When data is available on the device, the device may issue an indication such as, for example, an interrupt. The host may then interpret the indication as a hint that one or more data frames may be available on the device for reading. The device may issue reads of the 4-byte length tag at any time after interpreting the indication. If a frame is available, the tag read returns a nonzero length and the host can then read the remainder of the frame by issuing one or more data reads. If a frame is not available, the 4-byte tag read returns a specified 4-byte pattern to indicate that no more frame data is available.

Figure 4:
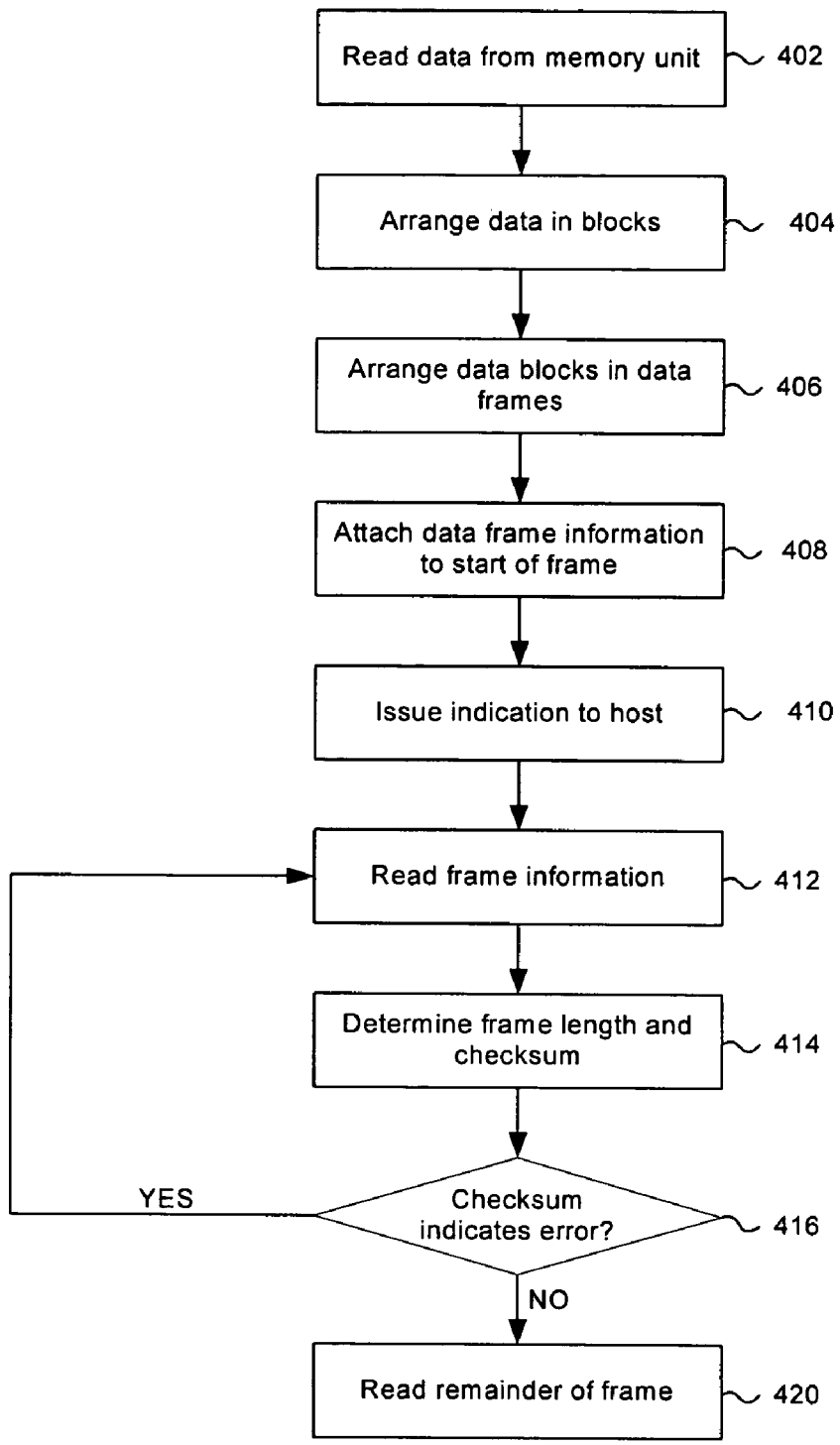
FIG. 4 illustrates a flow chart of an exemplary method for framing data, in accordance with an embodiment of the present invention.

FIG. 4 illustrates a flow chart of an exemplary method for framing data, in accordance with an embodiment of the present invention. The method may start when a device receives data from a memory unit such as, for example, a memory card at 402. The data may the be prepared to be sent to a host device for processing at 404. The data may be arranged in blocks, wherein each block may comprise, for example, a command and data corresponding to the command. At 406, blocks of data may then be arranged in frames to be sent together to the host device over a link such as, for example, a USB. Each frame may comprise a plurality of blocks of data, the number of which may vary from one frame to another. The device may then attach to the beginning of each frame data indicating frame information at 408. The frame information may comprise the frame length and the frame length checksum. The frame length may indicate the corresponding number of bytes within the frame, and the frame length checksum may provide an indication for verifying that the correct frame length is indicated. The frame information may occupy, for example, 4 bytes that may be added to the beginning of the first bytes of the frame, where 2 bytes may be utilized to indicate the frame length, and 2 bytes may be utilized for the frame length checksum.

When a data frame is ready to be transmitted, an indication such as, for example, an interrupt may be issued to the host at 410. When the host receives the indication, the first 4 bytes of the data frame may be read at 412 by the host. The frame information may then be interpreted by the host software to determine the frame length and checksum at 414. A determination may be made then as to whether the checksum indicates an error in the length information for the frame at 416. If there is no error, at 420 the host may receive the amount of data in the frame indicated by the received frame length as a frame sent over the link.

The various embodiments of the invention enable passing of messages over an addressed bus. This creates a form of information hiding, which passes information by converting an addressed bus interface to a message-based bus interface. Framing information may be added, comprising, for example, check pattern information and length information. The check pattern provides a mechanism for determining whether frame length information may be valid. An end device may utilize this length information to determine an actual length of an incoming frame. The combination of the check pattern and the length information may provide a pattern for resynchronizing a data stream when errors are detected. The framing mechanism may operate over existing addressed buses without requiring host side controller hardware modifications and additional host side software driver may be utilized to add the framing information. This allows the endpoint device 104 to act as an intelligent device by exchanging messages with the host device 102.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for transmitting data from a first device to a second device over a bus, said method comprising:
    configuring a portion of a frame to include a frame length and a frame length checksum of said frame, said configuring controlled by a code at said first device;
    first transmitting an interrupt from said first device indicating that at least one frame is available for reading by said second device;
    receiving a tag read command from said second device by said first device for reading said frame length and said frame length checksum;
    second transmitting said frame length and said frame length checksum from said first device in response to said tag read command; and
    third transmitting an amount of data indicated by said frame length from said first device to a second device via said bus using a bus protocol if said frame length is successfully validated by said frame length checksum.

2. The method according to claim 1, wherein said bus protocol is one of: a PCMCIA/CF bus protocol and a SD bus protocol.

3. The method according to claim 1, wherein said frame length checksum comprises a bit-wise inverse of said frame length.

4. The method according to claim 1, further comprising processing said frame based on using at least one specific address.

5. The method of claim 1 wherein said configuring a portion of said frame further comprises appending a command block comprising a function number that determines whether said frame length and said frame length checksum is to be checked if said bus comprises an SDIO bus.

6. The method of claim 5 wherein said function number comprises 3 bits.

7. The method of claim 5 wherein said command block comprises CMD 53.

8. The method of claim 1 wherein said frame length is specified using two bytes.

9. The method of claim 1 wherein said frame length checksum is specified using two bytes.

10. The method of claim 1 further comprising fourth transmitting a specified four byte pattern in response to said tag read if said at least one frame is not available.

11. A machine-readable storage having stored thereon, a computer program having at least one code section for transmitting information from a first device to a second device, the at least one code section being executable by a machine for causing the machine to perform steps comprising:
    configuring a first portion of a frame with a frame length and a frame length checksum of said frame;
    first transmitting said frame length and said frame length checksum to said second device via a bus using a bus protocol; and
    second transmitting a second portion of said frame from said first device to said second device via said bus using said bus protocol if said length information is successfully validated using said checksum information by said second device.

12. The machine-readable storage according to claim 11, wherein said bus protocol is one of: a PCMCIA/CF bus protocol and a SD bus protocol.

13. The machine-readable storage according to claim 11, wherein said frame length checksum comprises a bit-wise inverse of said frame length.

14. The machine-readable storage according to claim 9, wherein said at least one code section is used for processing said frame based on using at least one specific address.

15. A first device comprising:
an interface to a bus; and
a CPU for addressing a second device through said interface, said second device storing a frame of a group of at least one frame, said CPU used for first reading a function number of a field in said frame of a group of at least one frame, said CPU used for determining if said function number equals a specified value, said CPU used for second reading a frame header comprising frame length and frame length checksum information if said function number is of a specified value, said CPU used for verifying whether said frame length is valid based on using said checksum information after said second reading occurs, wherein said first device receives an amount of data indicated by said frame length if said frame length is valid.

16. The first device of claim 15 wherein said function number comprises 3 bits.

17. The first device of claim 15 wherein said frame length information comprises 2 bytes.

18. The first device of claim 15 wherein said frame length checksum information comprises 2 bytes.

19. The first device of claim 15 wherein said bus employs a PCMCIA/CF protocol.

20. The first device of claim 15 wherein said bus employs a SDIO protocol.

21. The first device of claim 15 wherein said second device comprises an SD memory card used for storing said at least one frame.

22. A method of transmitting SDIO data frames over a bus comprising:
first reading a function number from a header of an SDIO data frame, said header comprising said function number, a frame length of said SDIO data frame, and a frame length checksum of said SDIO data frame;
second reading said frame length and said frame length checksum if said function number equals a specified value;
validating said frame length using said frame length checksum; and
processing an amount of data indicated by said frame length if said frame length is successfully validated.

23. The method of claim 22 wherein said function number comprises 3 bits.

24. The method of claim 22 wherein said frame length comprises 2 bytes.

25. The method of claim 22 wherein said frame length checksum comprises 2 bytes.

26. A system comprising:
one or more circuits operable for, at least:
first reading a function number from a header of an SDIO data frame, said header comprising said function number, a frame length of said SDIO data frame, and a frame length checksum of said SDIO data frame;
second reading said frame length said frame length checksum if said function number equals a specified value;
validating said frame length using said frame length checksum; and
processing an amount of data indicated by said frame length if said frame length is successfully validated.

27. The system of claim 26 wherein said function number comprises 3 bits.

28. The system of claim 26 wherein said frame length comprises 2 bytes.

29. The system of claim 26 wherein said frame length checksum comprises 2 bytes.

* * * * *